United States Patent

[11] 3,616,878

[72] Inventor Jean-Claude Girauldon
   Ponthierry, France
[21] Appl. No. 862,755
[22] Filed Oct. 1, 1969
[45] Patented Nov. 2, 1971
[73] Assignee Societe Anonyme D.B.A.
[32] Priorities Oct. 3, 1968
[33]   France
[31]   168,641;
   Mar. 11, 1969, France, No. 6,908,288

[54] ANTIRATTLE SYSTEM FOR DISC BRAKE
3 Claims, 14 Drawing Figs.
[52] U.S. Cl. ........................................... 188/73.5,
   188/205 A
[51] Int. Cl. ..................................... F16d 65/02
[50] Field of Search ........................... 188/73.5,
   205 A

[56] References Cited
UNITED STATES PATENTS
| 3,357,523 | 12/1967 | Reed et al. | 188/73.5 |
| 3,442,354 | 5/1969 | Belart | 188/73.3 |
| 3,487,895 | 1/1970 | Seip | 188/71.8 |

Primary Examiner—George E. A. Halvosa
Attorney—C. F. Arens

ABSTRACT: The following relates to an antirattle system for use in a caliper-type disc brake which restraint movement of the friction pad assemblies with respect to and in the plane of the brake disc to limit the vibrational freedom of the pads and thereby reduce or eliminate undesirable noises. The antirattel mechanism includes at least one radially resilient tubing squeezed between the fixed support and the respective pad and having at least one projection extending toward said pad parallel to the plane of the disc to affix said tubing on a bare of lining portion of the backing plate of the pads.

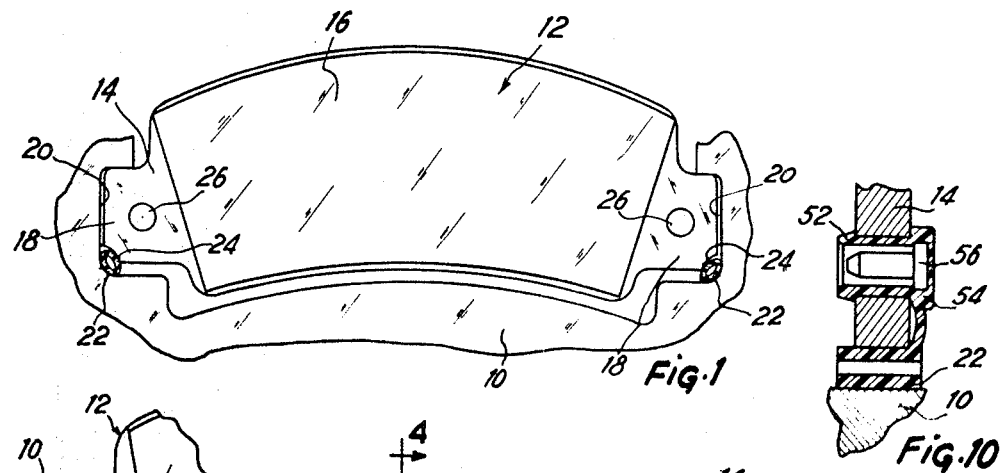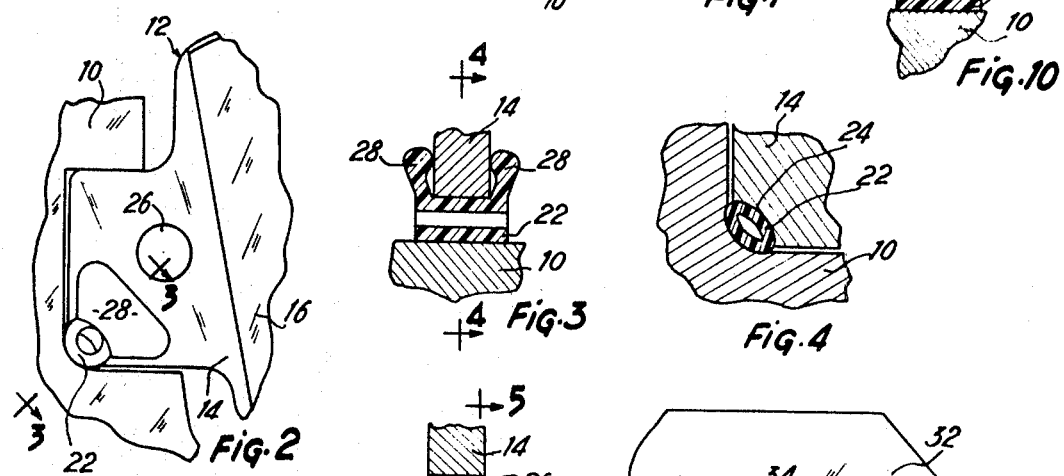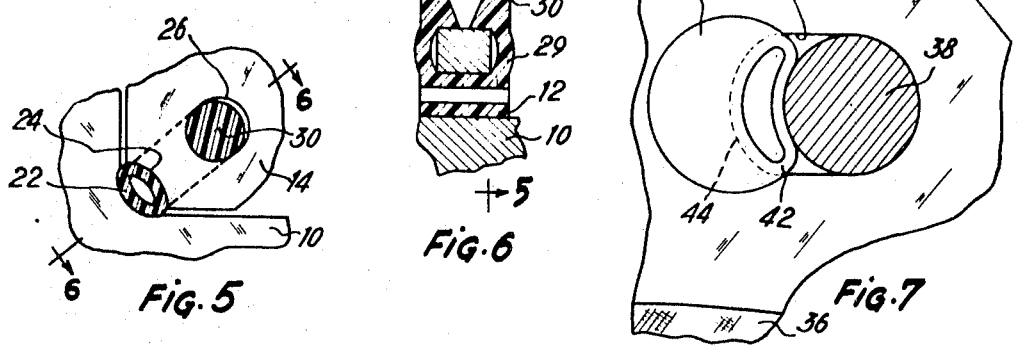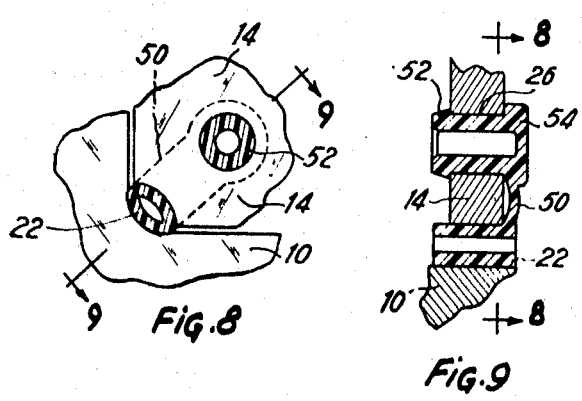

ANTIRATTLE SYSTEM FOR DISC BRAKE

This invention relates to disc brakes and more particularly to improvements therein providing efficient antirattle means.

The disc brake of the invention is of the type comprising a rotatable disc and a pair of friction pads arranged on the opposite sides thereof and slidably carried by a fixed support straddling the disc for being brought into engagement with the respective faces of the disc, said fixed support and said friction pads having respective sets of coacting anchoring and abutment surfaces formed thereon for restraining said friction pads against both circumferential and radial displacements, resilient tubular antagonistic means being interposed between said coacting surfaces for limiting vibrational freedom of said friction pads in the plane of the disc.

It has already been proposed to use in a disc brake resilient tubular means consisting of metallic spring pins inserted into part cylindrical cavities of the fixed support which are made so as to break out into the anchoring surfaces thereof. Portions of said spring pins project from said cavities and are received in correspondingly shaped recesses of the respective abutment surfaces of the friction pad.

Such metallic resilient spring pins consist of rolled sheet metal. It is very difficult to maintain them in the aforesaid cavities and one runs the risk of having them sliding axially toward the disc under the action of vibrations. It is in fact very difficult too meet the tolerances in machining the cavities or recesses and in forming the spring pins with accuracy. Another drawback of the metallic slotted tubes constituting the spring pins resides in that they cause the formation of grooves in the surfaces of the disc. Furthermore, they are generally generating sonic vibrations at very high frequencies.

The invention has for its object to avoid such drawbacks and proposes a disc brake of the type described above which is characterized in that said tubular means consist of at least one radially resilient tubing having at least at one end thereof a projection extending toward the associate pad parallely to the plane of the disc to affix said tubing on a portion bare of lining of the backing plate of said pad.

According to another feature of the invention, said tubing has a length which is substantially equal to the thickness of the backing plate of the pad and lugs are provided at both ends of said tubing which are made of the same material as the latter and resiliently engage the opposite faces of said backing plate of the pad.

According to still another feature of the invention the disc brake which is of the fixed caliper type and has pads suspended on axially extending pins passing through oblong openings provided therefor in said backing plate is further characterized in that such tubing is inserted in at least one of said openings, so as to be squeezed between a portion thereof and the respective pin, said lugs engaging the opposite faces of said backing plate close to the lateral edge of said portion of the oblong opening.

According to still another feature of the invention said tubings and lugs are made of sheet metal and said tubing comprises a spirally formed portion connected to said lugs at its respective lateral ends and adapted to resiliently engage said anchoring and abutment surface of the fixed support.

With this last-mentioned feature, the tubing antirattle means has a good behavior in the presence of high temperatures as encountered in the vicinity of the pad, the sliding of the latter on the fixed support is improved as well as the mounting of said pad in said support.

The invention will now be described with reference to the accompanying drawings in which:

FIG. 1 is a partial view of a disc brake of the invention showing a pad mounted in the fixed support of the brake with antirattle means inserted therebetween.

FIG. 2 is an enlarged view of one of the antirattle means according to a first embodiment.

FIG. 3 is a cross-sectional view taken along line 3—3 of FIG. 2.

FIG. 4 is a cross-sectional view along line 4—4 of FIG. 3.

FIG. 5 is a cross-sectional view of an antirattle means according to a second embodiment.

FIG. 6 is a cross-sectional view along line 6—6 of FIG. 5.

FIG. 7 shows a third embodiment comprising an antirattle means mounted on a pad suspended on axial pins solid with the brake fixed support.

FIGS. 8 and 9 show a fourth embodiment of antirattle means viewed in cross sections along lines 8—8 and 9—9 respectively.

FIG. 10 is a modification in which the antirattle means of FIGS. 8 and 9 includes a wear-indicating contact-forming plunger.

Figure 11:
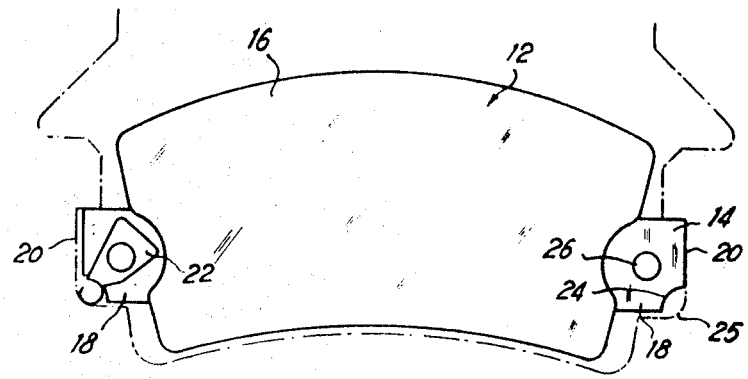

FIG. 11 shows a pad carrying an antirattle means according to a fifth embodiment of invention mounted in a fixed support shown in phantom line.

Figure 12:
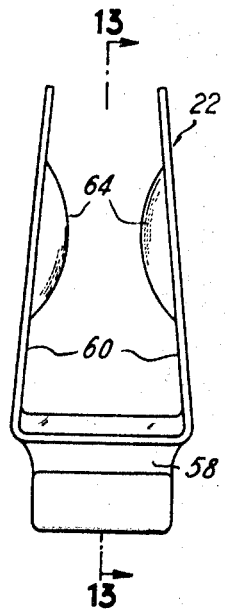

FIG. 12 shows the antirattle means of FIG. 11 at a larger scale.

Figure 13:
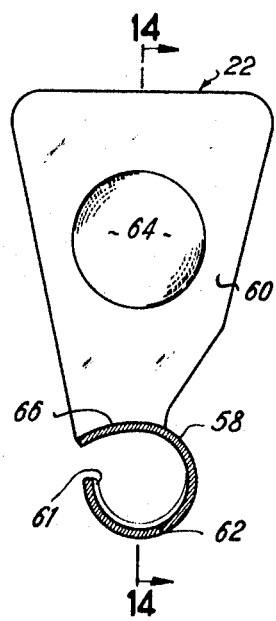

FIG. 13 is a cross-sectional view taken along line 13—13 of FIG. 12.

Figure 14:
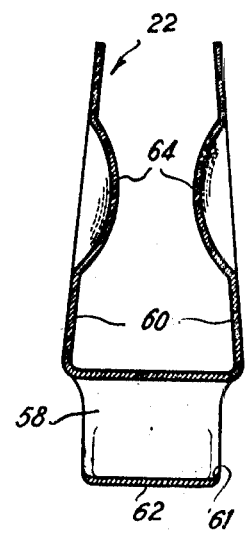

FIG. 14 is a cross-sectional view along line 14—14 of FIG. 13.

In FIG. 1 there is shown a fixed support 10 of a well-known floating caliper disc brake such as the one described in Laverdant's U.S. Pat. No. 3,368,647 in which are slidably mounted two friction pad assemblies, one of which only (pad 12) is to be seen on FIG. 1 A caliper (not shown) comprising at least one hydraulic actuator straddles the pads to urge the latter against the disc (not shown).

Friction pad assembly 12 comprises a backing plate 14 carrying a lining block 16. The backing plate 14 is bare of lining at its circumferentially spaced ends 18 which are received in corresponding notches 20 provided in the fixed support 10 and facing one another. Gaps or clearances are of course provided axially and circumferentially between the ends 18 and the notches 20. In these gaps are inserted the antirattle members which constitute the main object of this invention. Said members which have been shown at 22 in FIG. 1 consist of a plastic or elastomeric material tubing. To receive said tubing 22 there is provided a cutout portion 24 at one angle of backing plate 14. This cutout portion 24 has preferably the shape of a quarter round. In the drawing of FIG. 1, the tubings 22 are shown located in the bottom of pad 12 but it will be easily understood that they could be inserted at the top thereof as well, in similar quarter round cuttings.

Through the end portions 18 of pad 12 are machined openings 26 the use of which will appears later in the description.

A first embodiment of antirattle means according to the invention will now be described with reference to FIGS. 2 to 4. As shown in these FIGS., the tubing 22 is provided with extensions 28 forming parallely extending resilient and flexible lugs which clamp the bare of lining portion of the friction pad and constitute fastening means for the tubing. With such an arrangement the tubing is fixed on the pad before mounting of the latter in the brake. The pad may be handled with such antirattle means affixed thereto whereas in the piece devices they had to be inserted during the mounting operation.

In the second embodiment shown in FIGS. 5 and 6, the tubing 22 is maintained in the quarter round 24 by projections 29 bent at right angles to form cylindrical free ends 30 engaging the bore of opening 26.

The third embodiment shown in FIG. 7 relates to an antirattle means for a disc brake of the fixed caliper type in which the pads are suspended on two axially extending pins on which they are slidably mounted. The pins pass through holes drilled in a bare of lining portion of the pads so as to avoid radial escape of the pads. In FIG. 7 there may be seen a portion of such a pad comprising a portion of bare of lining backing plate 32 having an oblong opening 34 machined therethrough. A portion of the lining block has been shown at 36. Through opening 34 extends an axial supporting pin 38. To avoid rattle between the pad and pin 38, an antirattle tubing 42 has been inserted between said pin and the remaining portion of the opening 34. Tubing 42 is thus squeezed between pin 38 solid with the fixed support and the end 44 of the oblong opening 34. Lugs 46 similar to lugs 28 of FIGS. 2 and 3 are provided at the ends of tubing 42 and have the same function.

In the fourth embodiment of FIGS. 8 and 9 the tubing 22 is located between a quarter round 24 cutting of a pad end portion 14 and the fixed support 10. The fastening of said tubing is effected by means of a connection strip 50 made of plastic material to another tubing 52, in snap action engagement with the aforesaid hole 26. Tubing 52 has an enlarged cylindrical flat head 54 connected to strip 50.

According to a modification shown in FIG. 10 a plunger 56 forming a contact for an electrical wear indicating device may be inserted in tubing 52 in a known per se manner.

In FIG. 11, the same reference numerals have been used to designate parts similar to those of FIG. 1, and there is shown on this FIG. 11 an antirattle means 22A which will now be described in detail with reference to FIG. 12 to 14.

As shown in these FIGS., the antirattle means 22A comprises a spirally shaped or opened tubing 58 the respective lateral ends of which are connected to lugs 60 extending substantially parallel to one another when the antirattle means 22A is set in place straddlewise on the backing plate of pad but having before mounting their free ends that converge as shown in FIGS. 12 and 14.

Opened tubing 58 has a cylindrical surface 62 having an external radius which is slightly less or equal to the radius of the quarter round 25.

The antirattle means 22A is suitably made of resilient sheet metal.

At 64 the lateral lugs 60 are formed to present convex projections provided to engage the respective ends of opening 26.

The size of antirattle means 22A is such that the lugs thereof are located symmetrically with respect to the bisectrice line of the right angle 25 of the fixed support (or 24 of the pad) the top surface 66 of tubing 58 engaging the quarter round 24 whereas the cylindrical surface 62 engages quarter round 25.

The engagement of projections 64 into openings 26 permits an easy handling of the pads provided with their antirattle means 22A without any risk of dropping same.

In FIG. 11 there is shown a single means 22A on the left-hand side of said FIG. but it is evident that it is possible to adapt another one on the right-hand side of the pad. Generally one means 22A is enough and the opening 26 at the right side of the pad of FIG. 11 is then used to receive a wear-indicating contact.

What I claim is:

1. A disc brake comprising a rotatable disc and a pair of friction pads arranged on the opposite sides thereof and slidably carried by a fixed support straddling the disc for being brought into engagement with the respective faces of the disc, said fixed support and said friction pads having respective sets of coacting anchoring and abutment surfaces formed thereon for restraining said friction pads against both circumferential and radial displacement, resilient tubular antagonistic means being interposed between said coacting surfaces for limiting vibrational freedom of said friction pads in the plane of the disc, said tubular means consisting of at least one tubing having at least one projection extending toward the associate pad substantially parallel to the plane of the disc to affix said tubing on a portion bare of lining of the backing plate of said pad; and lugs provided at both ends of said tubing which are made of the same material as the latter and resiliently engage the opposite faces of said backing plate of the pad;

said lugs comprising at their free ends projecting portions facing each other and provided to be inserted in an opening provided in said pad backing plate therefor.

2. A disc brake comprising a rotatable disc and a pair of friction pads arranged on the opposite sides thereof and slidably carried by a fixed support straddling the disc for being brought into engagement with the respective faces of the disc, said fixed support and said friction pads having respective sets of coacting anchoring and abutment surfaces formed thereon for restraining said friction pads against both circumferential and radial displacement, resilient tubular antagonistic means being interposed between said coacting surfaces for limiting vibrational freedom of said friction pads in the plane of the disc, said tubular means consisting of at least one tubing having at least one projection extending toward the associate pad substantially parallel to the plane of the disc to affix said tubing on a portion bare of lining of the backing plate of said pad;

said tubing being made of plastic material and being connected at one of its ends by a link to another plastic or elastomeric resilient tubing engaging by a snap action an opening made in said backing plate.

3. A disc brake according to claim 2, wherein said other resilient tubing includes a metallic plunger adapted to constitute the contact element of a wear-indicating system.

* * * * *